United States Patent [19]

Oshel et al.

[11] 4,265,588

[45] May 5, 1981

[54] METHODS FOR LOADING AN AIR TRANSPORTABLE TRAILER ABOARD AN AIRCRAFT AND FOR UNLOADING IT THEREFROM

[75] Inventors: J. Bryan Oshel, Spring Valley; Robert J. Bennett, San Diego, both of Calif.

[73] Assignee: International Harvester Company, Chicago, Ill.

[21] Appl. No.: 68,384

[22] Filed: Aug. 21, 1979

[51] Int. Cl.³ .......................... B64C 1/22; B64D 9/00
[52] U.S. Cl. .............................. 414/786; 244/137 R; 410/3; 410/56; 414/500; 414/538
[58] Field of Search ............. 414/333, 500, 538, 559, 414/786; 244/137 R; 410/2, 3, 52, 56, 57, 65

[56] References Cited

U.S. PATENT DOCUMENTS

| 2,010,969 | 8/1935 | Soulis . | |
|---|---|---|---|
| 3,649,047 | 3/1972 | Plantan . | |
| 4,179,997 | 12/1979 | Kirwan | 414/333 X |

*Primary Examiner*—Jeffrey V. Nase
*Attorney, Agent, or Firm*—LeBlanc, Nolan, Shur & Nies

[57] ABSTRACT

Mobile, air transportable, trailers or vans which have retractable landing gear at one end thereof, a jacking/skid plate at the opposite end, and retractable running gear. The disclosed trailers can be loaded on and unloaded from aircraft without removing the underbody of the trailer and without ground handling equipment by as few as two persons.

5 Claims, 12 Drawing Figures

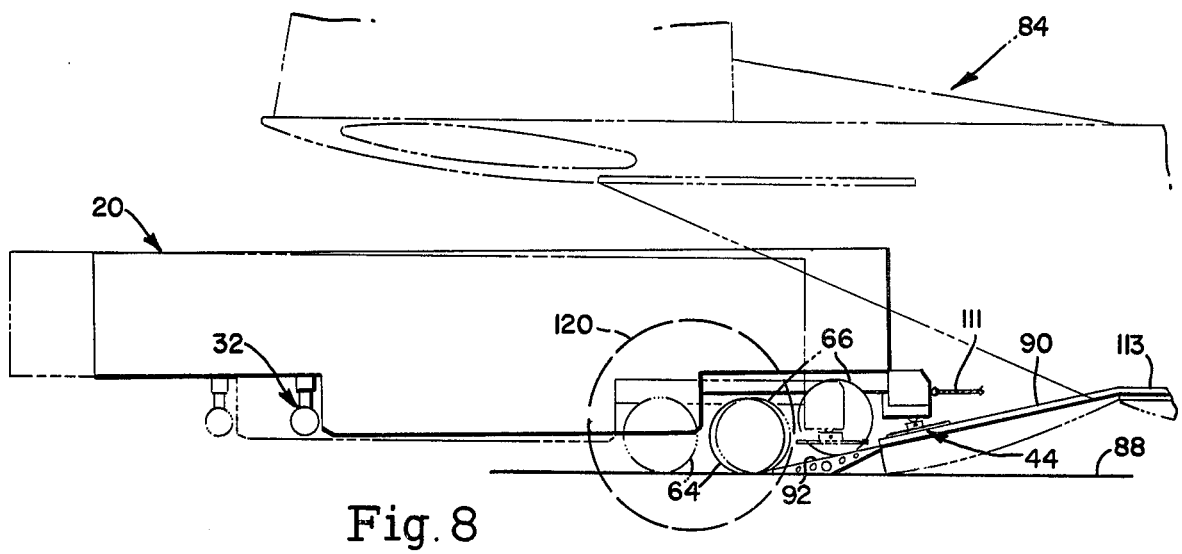
Fig. 8
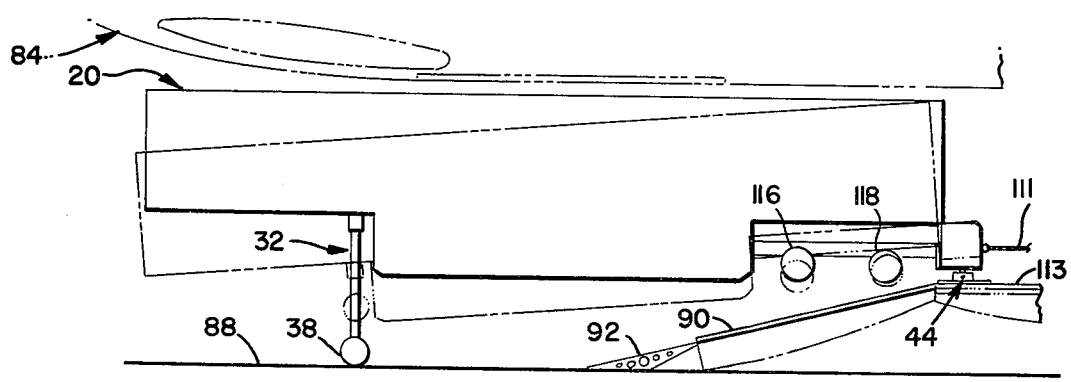
Fig. 9
Fig. 7
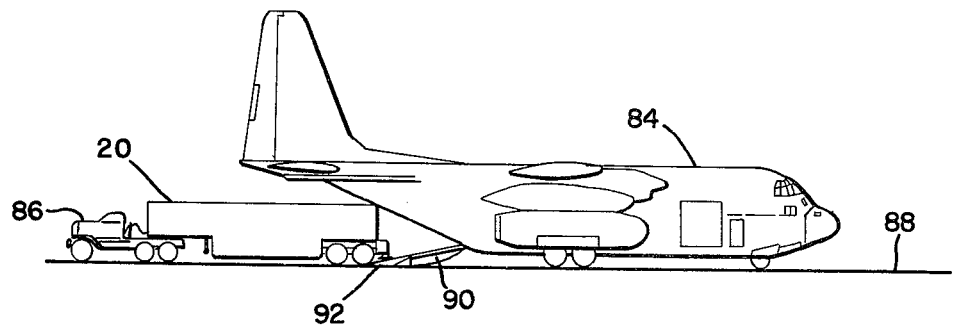

METHODS FOR LOADING AN AIR TRANSPORTABLE TRAILER ABOARD AN AIRCRAFT AND FOR UNLOADING IT THEREFROM

The present invention relates to mobile trailers (or vans). More specifically, the present invention relates to novel, improved trailers of the character just described which can be loaded onto and unloaded from aircraft without ground handling equipment and with a minimum of personnel.

One primary object of the present invention is to provide trailers, or vans, of the character just described.

Conventionally, the loading of vans or trailers of the type with which we are concerned aboard aircraft involves the removal of the trailer from its undercarriage and the use of ground handling equipment to lift the trailer from its undercarriage to a position where it can be taken aboard by the onboard cargo handling system of the aircraft. At the destination to which the trailer is transported the loading sequence is essentially reversed, again with the use of ground handling equipment, to offload the trailer and mount it on an appropriate undercarriage.

This conventional approach has the disadvantage that it requires ground handling equipment and a trailer undercarriage at both the loading point and the destination of the trailer. These requirements are particularly objectionable in military, disaster relief, and comparable situations because of the difficulty, or impossibility, of providing the requisite equipment at the location where the trailer is wanted.

The conventional method of loading trailers on and unloading them from aircraft is also objectionable because of the manpower and amount of time required. The latter disadvantage is particularly important in combat and comparable situations.

In contrast to the conventional approach just described, our novel technique for loading trailers on and unloading them from aircraft requires no ground handling equipment, and only two men (plus the aircraft's loadmaster) can load or unload a trailer in a period of on the order of one hour.

The foregoing and other important advantages are obtained by employing a novel combination of vertically extensible landing gear and a skid/jacking plate which allows the trailers we have invented to be so maneuvered that they can be pulled aboard by the onboard winch of an aircraft and pulled or skidded out of the aircraft with the tractor or other prime mover supplied to haul the trailer.

We also employ retractible running gear in conjunction with the novel combination of components just identified. This allows our novel trailers to be loaded without removing their undercarriages, an obvious advantage not possessed by conventional trailers.

Still other features of our invention are auxiliary loading ramps and novel fixtures by which the auxiliary ramps can be quickly and easily connected to existing onboard loading ramps. The auxiliary ramp arrangement is important in that it facilitates the loading and unloading of trailers with the characteristics just discussed.

One primary object of our invention was described above.

A related, primary and important object of our invention is the provision of novel, improved methods for loading trailers on, and for unloading them from, aircraft.

Other important objects and features and additional advantages of the present invention will become apparent from the appended claims and as the ensuing detailed description and discussion proceeds in conjunction with the accompanying drawing, in which;

FIGS. 7, 8 and 9 are generally pictorial illustrations showing sequentially, the steps involved in loading a trailer embodying the principles of the present invention into an aircraft;

Figure 1:
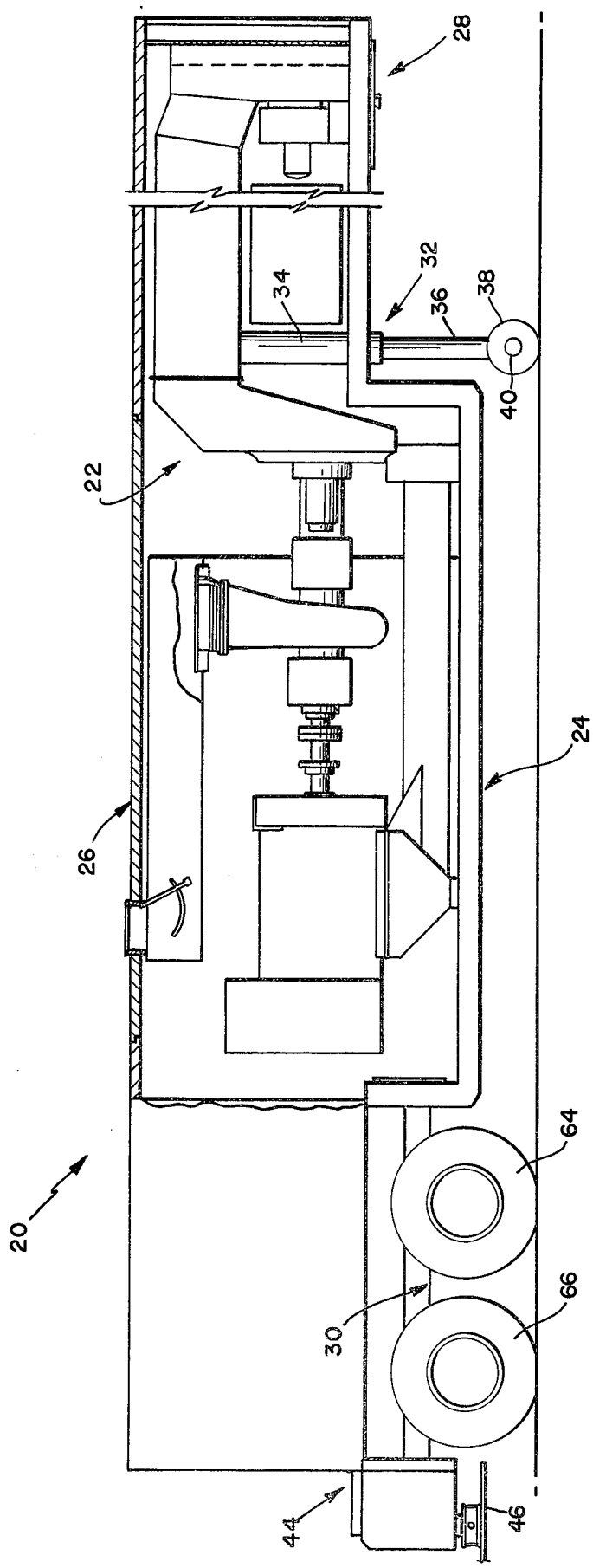
FIG. 1 is a curbside elevation of an air transportable trailer constructed in accord with and embodying the principles of the present invention, the near sidewall of the trailer being removed for the sake of clarity.

Referring now to the drawing, FIG. 1 depicts, in generally pictorial form, a trailer 20 constructed in accord with, and embodying, the principles of the present invention. The exemplary trailer illustrated in that figure is designed to house a turbogenerator set identified generally by reference character 22 and to be loaded aboard a C-130 aircraft. Dry, it weighs 36,835 pounds.

For the most part, the details of trailer 20, like the turbogenerator set, are not part of the present invention. Accordingly, such details will be described and referred to only to the extent necessary to facilitate an understanding of our invention.

Trailer 20 has a frame identified generally by reference character 24 and made up of standard structural shapes (the individual strucutral members are not shown). Supported on frame 24 is a superstructure 26 of monocoque construction.

The trailer is adapted to be coupled to a tractor or other prime mover by a conventional fifth wheel coupling 28 at its forward end. There is running gear identified generally by reference character 30 at the opposite, rear end of the trailer (see also FIG. 6).

Figure 3:
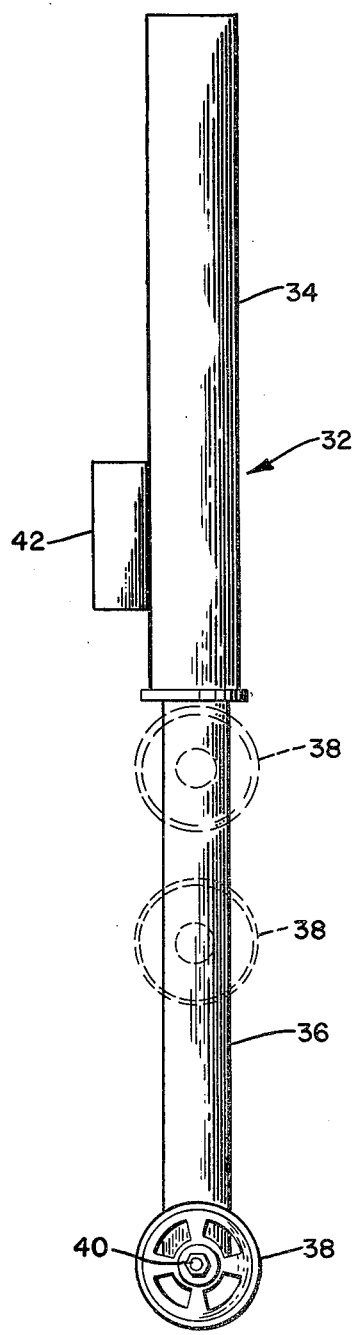
FIG. 3 is a side view of the landing gear.
Figure 2:
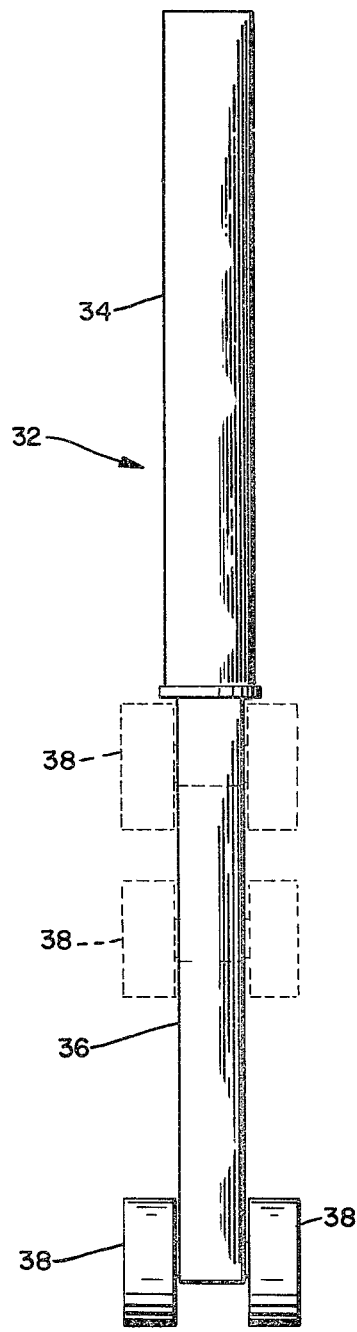
FIG. 2 is a front view of one of a pair of vertically extensible landing gears at the front of the trailer.

Referring now to FIGS. 1-3, trailer 20 includes landing gear 32 located toward the front end of the trailer. Typically, two such landing gear are employed, one at each side of the trailer. However, the number of landing gear can be increased, or decreased, depending upon the application to which the principles of our invention is put.

Each landing gear 32 includes a housing 34 supported from the frame 24 of the trailer, a vertically extensible leg 36 telescopically received in housing 34, and wheels 38 rotatably supported from the lower end of leg 36 on an axle 40.

The landing gear can be extended to the position shown in full lines in FIGS. 2 and 3 and retracted to the positions shown in dotted lines in the same figures by an actuator shown generally in FIG. 3 and identified by reference character 42. Typically, this actuator will be of the hand crank type as shown in, for example, U.S. Pat. Nos. 3,111,341 issued Nov. 19, 1963, to Fujioka et al; 3,197,235 issued July 27, 1965, to Chieger; and 3,163,306, issued Dec. 29, 1964, to Bennett et al. However, the actuator for retracting and extending the landing gear may equally well be hydraulically operated (see U.S. Pat. Nos. 2,812,193 issued Nov. 5, 1957, to Grace and 2,572,410 issued Oct. 23, 1951, to Van Doorne); or the actuator may be of the electric or pneumatic type.

At the opposite, rear end of trailer 20 is a skid/jacking plate assembly 44 which is also an important feature of our invention.

That assembly includes an articulated plate 46 pivotally connected by brackets 48 and pivot pins 50 to the lower ends of telescopically retractible and extensible jack members 52. The jacks (54) also include housings 56 fixed to the frame 24 of trailer 20 on opposite sides and at the rear end thereof (see FIG. 4) and actuators 58 for retracting and extending components 52. As in the case of landing gear actuators 42 those associated with jacks 54 may be mechanically, hydraulically, pneumatically, or electrically actuated.

The final feature of trailer 20 which is of major importance as far as the present invention is concerned is the retractible running gear 30 alluded to above.

Unlike that employed in conventional trailers designed for loading aboard airplanes or other craft, the running gear or undercarriage 30 of trailer 20 is an integral or permanent part of the trailer construction and need not be removed to load the trailer.

Figure 6:
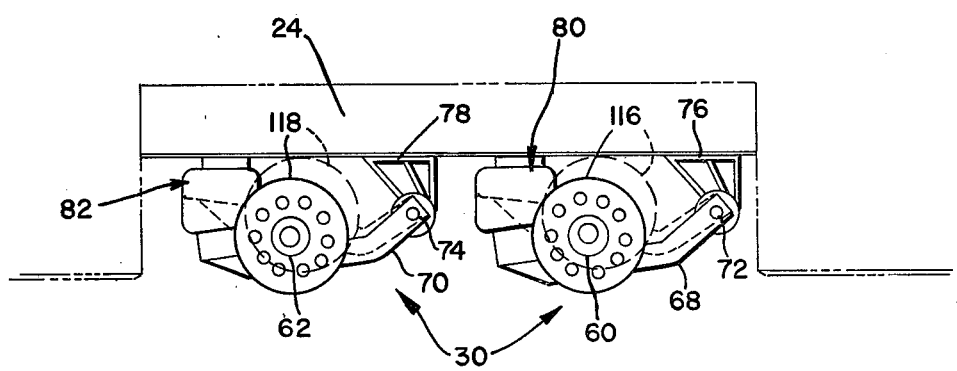
FIG. 6 is a partial view of the trailer with the trailer wheels removed and the running gear of the trailer in a retracted position.
Figure 10:
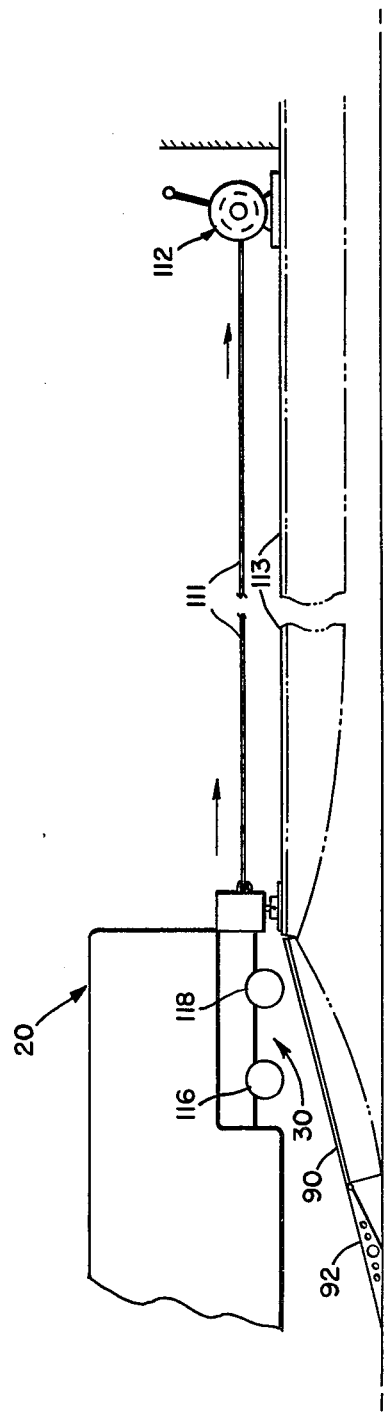
FIG. 10 is an illustration of similar character showing the onboard cargo handling system of the aircraft.

Turning then to FIGS. 1 and 6, running gear 30 is of broadly the same type as that described in U.S. Pat. No. 3,001,796 issued Sept. 26, 1961, to E. P. Martin. It includes front and rear axles 60 and 62 to which dual wheels are attached. The outer front and rear wheels on one side of the trailer are identified by reference characters 64 and 66 in FIG. 1.

Axles 60 and 62 are pivotally supported by trailing arms 68 and 70. The trailing arms are connected by pivot members 72 and 74 to brackets 76 and 78 at opposite sides of trailer 20 and mounted on its frame 24.

Front and rear axles 60 and 62 are also connected to the trailer frame 24 through front and rear, spring assisted, air bay type suspension systems 80 and 82. There are two front and two rear suspension systems, one at each side of the trailer.

Suspension systems 80 and 82 cushion the trailer when it is being moved and, also, allow axles 60 and 62 to be extended and retracted to the positions shown in full and dotted lines in FIG. 6.

The details of suspension systems 80 and 82 have not been shown as they are, per se, not part of our invention.

The steps involved in loading the novel trailers 20 just described aboard an aircraft and unloading it therefrom can best be understood by referring to FIGS. 7-10 in which the aircraft is identified by reference character 84 and the tractor or prime mover used to haul the trailer by reference character 86.

FIG. 7 depicts airplane 84 (in this case a C-130) positioned on a runway 88 with its cargo hatch open and its loading ramp 90 lowered to the runway.

Figure 11:
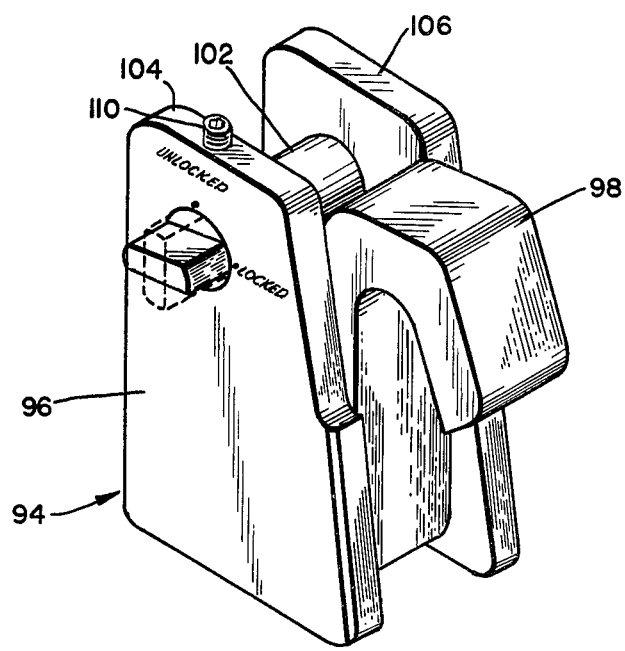
FIG. 11 is a perspective view of a fixture which can be employed to connect an auxiliary loading ramp to the existing cargo ramp of an aircraft and thereby facilitate the loading of the trailer.
Figure 12:
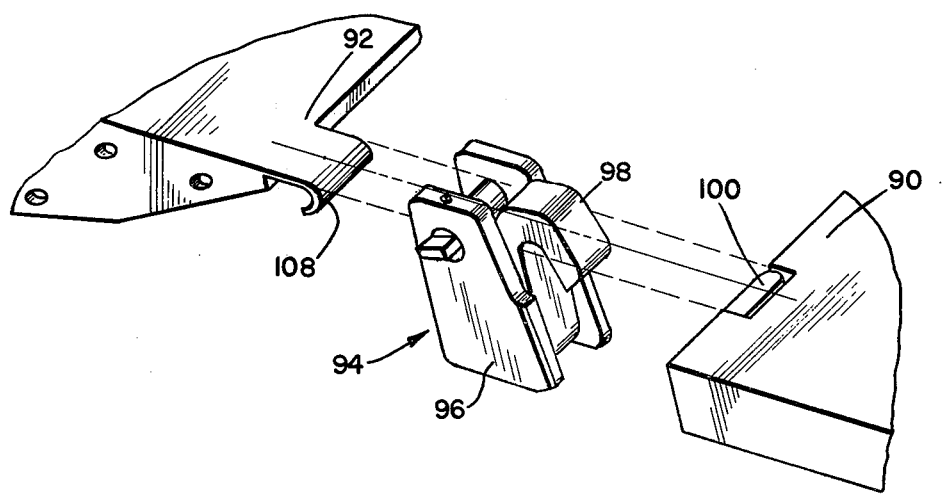
FIG. 12 is an exploded view illustrating the relationship among the cargo ramp, connecting fixture, and auxiliary loading ramp.

As exemplified by the application of our invention under discussion, advantage can be taken of auxiliary ramps 92 to facilitate the loading of trailer 20; and we have invented a novel adapter fixture 94 (see FIGS. 11 and 12) which permits the auxiliary ramps to be quickly and easily coupled to an existing, onboard loading ramp.

The adapter has a body 96 and a hook 98 which is configured to engage the onboard loading ramp retaining pin 100. Each fixture also includes an eccentrially configured or mounted retaining pin 102 supported in brackets 104 and 106 for rotation between the unlocked and locked positions shown in dotted and full lines, respectively, in FIG. 11.

After the fixtures are assembled to onboard ramp 90, their retaining pins 102 are rotated to the unlocked position; and hooks 108 at the front ends of the auxiliary loading ramps 92 are engaged over them. The retaining pins are then rotated to the locked position to secure the auxiliary loading ramps in place, and setscrews 110 threaded into the fixtures are tightened against the retaining pins to keep them in the locked position.

With the auxiliary loading ramps installed (if necessary) trailer 20 is backed up to the aircraft as shown in FIG. 7.

The cable 111 of an onboard aircraft winch 112 conventionally located at the forward end of the aircraft cargo area (see FIG. 10) is then attached to the rear end of the trailer; and, maintaining tension on the cable, the trailer is backed up ramps 92 and 90 (see FIG. 8) until skid/jacking plate 46 is positioned over the cargo deck 113 of the aircraft as shown in FIG. 9, the articulation of plate 46 permitting it to move from the loading ramp onto the cargo deck.

Figure 4:
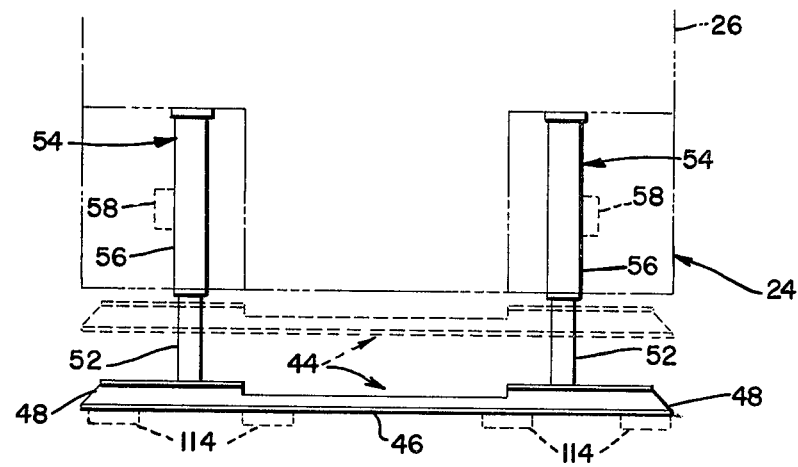
FIG. 4 is a rear view of a skid/jacking plate assembly at the rear of the trailer.
Figure 5:
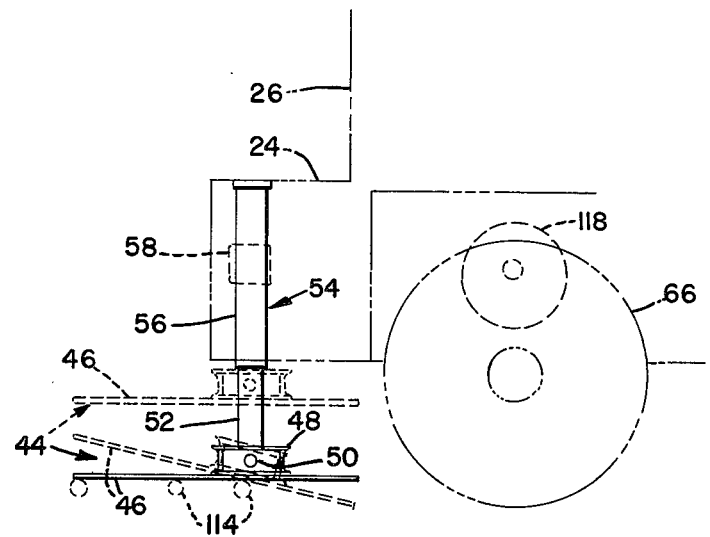
FIG. 5 is a side view of the jacking plate assembly.

As indicated in FIG. 4, rollers 114 will typically be installed in the cargo deck to facilitate the loading and unloading of cargo, and skid plates (not shown) on the bottom of trailer frame 24 as well as plate 46 are located to ride on those rollers.

With the trailer positioned as shown in FIG. 9, landing gear actuators 42 are energized to extend the landing gear until wheels 38 engage runway 88.

Tractor 86 is then uncoupled from the trailer but kept in a position where it will keep the trailer from moving forward as a safety measure.

Next, actuators 58 are activated, lowering jacking/skid plate 46 and raising the rear end of trailer 20 so that wheels 64 and 66 can be removed. Air is then exhausted from running gear suspension systems 80 and 82 to partially retract axles 60 and 62, and the wheels are dismounted.

Blocks (not shown) are next placed under the wheel hubs 116 and 118 of the running gear, the suspension systems 80 and 82 completely deflated, and actuators 58 activated to retract skid/jacking plate 46 and lower the rear end of trailer 20. As this occurs, hubs 116 and 118 contact the blocks, moving axles 60 and 62 overcenter with the spring assists of the suspension mechanisms then automatically retracting the axles to the full up position shown in dotted lines in FIG. 6.

At this juncture in the loading sequence, auxiliary loading ramps 92 and adapter fixtures 94 are removed. Because the trailer is at this point still positioned above the ramps, they cannot be rotated upwardly to disconnect them as is conventional with aircraft cargo ramps.

The novel adapter fixtures discussed above make this unnecessary, however, as the auxiliary ramps can be removed simply by loosening setscrews 110, rotating locking pins 102 to their unlocked positions, unhooking the auxiliary ramps from the retaining pins, and finally unhooking the fixtures from the retaining pins 100 of the onboard ramps.

The lowering of the rear end of the trailer is then continued until the underbody skids contact the cargo deck rollers so the trailer will clear the cargo hatch. The landing gears 32 of the trailer are extended, raising the trailer so tractor 86 can be driven away.

After then further raising the front end of the trailer, the onboard winch 112 is activated, hauling trailer 20 into the aircraft until landing gears 32 closely approach the foot of auxiliary loading ramps 92. At this point, the center of gravity of the trailer is well within aircraft 84.

The landing gear are then retracted to the full up position, the trailer winched to the position in which it will be transported, and trailer tie downs installed.

The sequence followed to unload trailer 20 is, in general, the reverse of the loading sequence just described. It will, accordingly, not be described in great detail herein.

Briefly, however, the tie downs are removed, the cable of the onboard winch 112 attached to the rear of the trailer so that the winch can be employed as a brake, and a tractor or other prime mover attached to the front end of the trailer by a cable or chain (not shown).

The prime mover is employed to haul or skid the trailer out of the aircraft until the landing gear clear the loading ramps. The landing gear is then lowered to the runway and the trailer raised by lowering or extending skid plate 46 and continuing the extension or lowering of the landing gear.

The trailer is next hauled out of the aircraft until it reaches approximately the position shown in full lines in FIG. 9.

The auxiliary loading ramp (if employed) is then installed and skid plate 46 is lowered until the rear end of the trailer is in its fully raised position so that wheels 64 and 66 can be mounted. Then air bags of suspension systems 80 and 82 are partially inflated to facilitate the attachment of the wheels, the wheels installed, and the air bags thereafter fully inflated to lower the front and rear axles 60 and 62 of the running gear to the ride or running positions shown in full lines in FIG. 6.

Finally, the jacking/skid plate is retracted to its full up position, the front end of trailer 20 lowered to tractor height by retracting landing gears 32, the tractor connected to the trailer, the landing gear fully retracted, and the winch cable disconnected, making the trailer fully roadable.

Variations may of course be made in the loading and unloading sequences as well as in the details of the trailer construction and the types of loads they are intended to carry. For example, the circle identified in FIG. 8 by reference character 120 illustrates an alternate position of running gear 30 in which wheels 64 and 66 can be removed, the trailer being then skidded up the loading ramp and into the aircraft.

Other variations will be readily apparent to those skilled in the arts to which this invention pertains.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of loading a trailer coupled to a tractor and having vertically extensible landing gear at one end thereof, a jacking and support means at the opposite end thereof, and retractable running gear including roadable wheels into an aircraft having a cargo deck and equipped with an onboard winch and a cargo ramp, said method including the steps of: positioning said trailer with said jacking and support means over and in contact with said cargo ramp or said cargo deck; extending said landing gear into contact with the surface on which said aircraft and said trailer are standing; disconnecting said tractor from said trailer; removing the wheels from said running gear; winching said trailer into said aircraft until said landing gear approach said ramp; retracting said landing gear; and completing the winching of said trailer into said aircraft.

2. A method as defined in claim 1 in which said jacking and support means is so actuated as to raise said opposite end of said trailer relative to said cargo deck and thereby facilitate the removal of the running gear wheels prior to removing those wheels.

3. A method as defined in claim 2 wherein, after the running gear wheels are removed, said jacking and support means is so actuated as to effect a retraction of said running gear and to lower said opposite end of said trailer toward said cargo deck.

4. A method of unloading a trailer having vertically extensible, wheeled landing gear at one end there, a jacking and support means at the opposite end thereof, and running gear with an axle in a retracted position from an aircraft in which said trailer is loaded, said method including the steps of: attaching a prime mover to said trailer; hauling said trailer from said aircraft with said prime mover until said landing gear clear the aircraft; extending said landing gear into contact with the surface on which said aircraft is standing; continuing to haul said trailer from said aircraft with said prime mover until said running gear is clear of said aircraft; mounting wheels on said axle; and extending said running gear to lower said axle to a running position and bring said wheels into contact with said surface.

5. A method as defined in claim 4 in which said trailer is made mobile by coupling said prime mover to the end of said trailer at which said landing gear are located and then retracting said landing r.

* * * * *

UNITED STATES PATENT AND TRADEMARK OFFICE
CERTIFICATE OF CORRECTION

PATENT NO. : 4,265,588
DATED : May 5, 1981
INVENTOR(S) : J. Bryan Oshel and Robert J. Bennett It is certified that error appears in the above—identified patent and that said Letters Patent is hereby corrected as shown below:

Col. 6, line 58, change "r" to --gear--.

*Signed and Sealed this*

*Twentieth* Day of *April 1982*

[SEAL]

*Attest:*

*Attesting Officer*

GERALD J. MOSSINGHOFF

*Commissioner of Patents and Trademarks*